US009129289B2

(12) United States Patent
Vaughn et al.

(10) Patent No.: US 9,129,289 B2
(45) Date of Patent: Sep. 8, 2015

(54) SYSTEMS AND METHODS FOR PROVIDING REMOTE ORDERING CAPABILITIES

(76) Inventors: Drew Vaughn, Glastonbury, CT (US); Greg Hughes, Glastonbury, CT (US); John M. Hughes, Hebron, CT (US); Michael Aaron Fogleman, Middletown, CT (US)

( * ) Notice: Subject to any disclaimer, the term of this patent is extended or adjusted under 35 U.S.C. 154(b) by 1496 days.

(21) Appl. No.: 11/540,945

(22) Filed: Sep. 29, 2006

(65) Prior Publication Data
US 2007/0088624 A1 Apr. 19, 2007

Related U.S. Application Data

(60) Provisional application No. 60/723,127, filed on Oct. 3, 2005.

(51) Int. Cl.
| *G06Q 30/00* | (2012.01) |
| *G06Q 50/00* | (2012.01) |
| *G06Q 30/02* | (2012.01) |
| *G06Q 30/06* | (2012.01) |
| *G06Q 50/12* | (2012.01) |
| G06G 1/14 | (2006.01) |
| G06Q 20/00 | (2012.01) |
| G06Q 10/00 | (2012.01) |

(52) U.S. Cl.
CPC .............. *G06Q 30/02* (2013.01); *G06Q 30/06* (2013.01); *G06Q 30/0635* (2013.01); *G06Q 50/12* (2013.01)

(58) Field of Classification Search
USPC ......................................... 705/15, 22, 26, 28
See application file for complete search history.

(56) References Cited

U.S. PATENT DOCUMENTS

| 4,797,818 | A | * | 1/1989 | Cotter ............................. 705/15 |
| 5,845,263 | A | * | 12/1998 | Camaisa et al. ................. 705/15 |
| 5,890,136 | A | | 3/1999 | Kipp |
| 5,907,275 | A | * | 5/1999 | Battistini et al. ......... 340/286.09 |
| 5,991,739 | A | * | 11/1999 | Cupps et al. .................. 705/26.8 |
| 6,026,375 | A | | 2/2000 | Hall et al. |
| 6,073,840 | A | | 6/2000 | Marion |
| 6,098,879 | A | | 8/2000 | Terranova |
| 6,116,505 | A | | 9/2000 | Withrow |
| 6,249,772 | B1 | | 6/2001 | Walker et al. |
| 6,259,780 | B1 | | 7/2001 | Sherwood et al. |
| 6,341,268 | B2 | | 1/2002 | Walker et al. |
| 6,370,513 | B1 | * | 4/2002 | Kolawa et al. ................ 705/7.33 |
| 6,374,240 | B1 | * | 4/2002 | Walker et al. ................... 705/15 |
| 6,381,582 | B1 | | 4/2002 | Walker et al. |
| 6,422,464 | B1 | | 7/2002 | Terranova |
| 6,459,782 | B1 | | 10/2002 | Bedrosian et al. |
| 6,470,233 | B1 | | 10/2002 | Johnson, Jr. |
| 6,529,880 | B1 | | 3/2003 | McKeen et al. |
| 6,574,603 | B1 | | 6/2003 | Dickson et al. |
| 6,587,835 | B1 | | 7/2003 | Treyz et al. |
| 6,608,892 | B2 | | 8/2003 | Shaffer et al. |
| 6,671,358 | B1 | | 12/2003 | Seidman et al. |
| 6,721,406 | B1 | | 4/2004 | Contractor |

(Continued)

Primary Examiner — Ig T An
(74) Attorney, Agent, or Firm — McCormick, Paulding & Huber LLP

(57) ABSTRACT

The invention relates to methods and systems for receiving, processing and fulfilling remotely placed orders. In one aspect, requests to place an order are received from a remote location, and based on a customer identifier included in the request, customer preference data is retrieved. An electronic selection menu based on customer preference data is transmitted to the customer, the order is received and prepared. The customer's arrival is automatically detected, and the completed order is provided to the customer.

13 Claims, 14 Drawing Sheets

(56) References Cited

U.S. PATENT DOCUMENTS

| | | |
|---|---|---|
| 6,741,969 B1 * | 5/2004 | Chen et al. ............... 705/14.27 |
| 6,754,636 B1 | 6/2004 | Walker et al. |
| 6,759,072 B1 | 7/2004 | Gutwein et al. |
| 6,764,003 B1 | 7/2004 | Martschitsch et al. |
| 6,771,981 B1 | 8/2004 | Zalewski et al. |
| 6,808,731 B1 | 10/2004 | Gutwein et al. |
| 6,819,919 B1 | 11/2004 | Tanaka |
| 6,850,901 B1 | 2/2005 | Hunter et al. |
| 6,865,261 B1 | 3/2005 | Rao et al. |
| 6,914,582 B2 | 7/2005 | Tanaka |
| 6,940,393 B2 | 9/2005 | Dev et al. ............... 340/286.09 |
| 6,947,571 B1 | 9/2005 | Rhoads et al. |
| 6,982,733 B1 | 1/2006 | McNally et al. |
| 7,039,170 B1 | 5/2006 | Sylvain |
| 7,046,777 B2 | 5/2006 | Colson et al. |
| 7,085,818 B2 | 8/2006 | Brown et al. |
| 7,110,964 B2 | 9/2006 | Tengler et al. |
| 7,143,039 B1 | 11/2006 | Stifelman et al. |
| 7,222,087 B1 | 5/2007 | Bezos et al. |
| 7,280,979 B1 | 10/2007 | Katz et al. |
| 7,287,002 B1 | 10/2007 | Asher et al. |
| 7,359,871 B1 | 4/2008 | Paasche et al. |
| 7,636,718 B1 | 12/2009 | Steen et al. |
| 7,711,606 B2 | 5/2010 | Snyder |
| 2001/0049623 A1 * | 12/2001 | Aggarwal et al. ............... 705/14 |
| 2002/0016747 A1 * | 2/2002 | Razumov ............... 705/26 |
| 2002/0091577 A1 | 7/2002 | Parry et al. |
| 2002/0138350 A1 * | 9/2002 | Cogen ............... 705/15 |
| 2002/0152123 A1 * | 10/2002 | Giordano et al. ............... 705/14 |
| 2002/0165789 A1 | 11/2002 | Dudek et al. |
| 2002/0174133 A1 | 11/2002 | Sarukkai et al. |
| 2003/0065565 A1 | 4/2003 | Wagner et al. |
| 2004/0024650 A1 | 2/2004 | Chen et al. |
| 2004/0030573 A1 * | 2/2004 | Sidlo et al. ............... 705/1 |
| 2004/0054587 A1 | 3/2004 | Dev et al. |
| 2004/0085927 A1 * | 5/2004 | Yannay et al. ............... 370/329 |
| 2004/0143503 A1 | 7/2004 | Suthar |
| 2004/0158494 A1 | 8/2004 | Suthar |
| 2004/0158499 A1 | 8/2004 | Dev et al. ............... 705/26 |
| 2004/0177762 A1 | 9/2004 | Gutwein et al. |
| 2004/0215517 A1 * | 10/2004 | Chen et al. ............... 705/14 |
| 2005/0010428 A1 | 1/2005 | Bergeron et al. |
| 2005/0015256 A1 | 1/2005 | Kargman |
| 2005/0043996 A1 | 2/2005 | Silver |
| 2005/0049921 A1 * | 3/2005 | Tengler et al. ............... 705/15 |
| 2005/0049940 A1 | 3/2005 | Tengler et al. |
| 2005/0071232 A1 | 3/2005 | Frater |
| 2005/0075934 A1 * | 4/2005 | Knight et al. ............... 705/15 |
| 2005/0273345 A1 * | 12/2005 | Castillejo Romero ............... 705/1 |
| 2006/0006025 A1 | 1/2006 | Dev et al. ............... 186/36 |
| 2006/0076397 A1 * | 4/2006 | Langos ............... 235/375 |
| 2006/0178943 A1 | 8/2006 | Rollinson et al. ............... 705/26 |
| 2006/0206390 A1 | 9/2006 | Asano |
| 2006/0206395 A1 * | 9/2006 | Vallabh ............... 705/26 |
| 2006/0218040 A1 | 9/2006 | Sabapathypillai |
| 2007/0088620 A1 | 4/2007 | Tengler et al. |

* cited by examiner

900

Tribeca Cafe - Mosilla Firefox

File Edit View Go Bookmarks Tools Help

| Expresso Pass |
|---|
| Contact Us |

Expresso Pass
> Account Information
> Billing Information
> Expresso Pass Manager
> User Manager
> Order for Pickup
> Favorite Orders Manager
> History
> Logout Expresso Pass
Account Information
This site is secure

*Email Address:    mfogleman@topcoder.com
*Password:         ******
*Confirm Password: ******

*Title:       [Mr ▼]
*First Name:  [John]
*Last Name:   [Doe]
Age:          [24]
*Address:     [123 Sunny Dr]
Address:      [         ]
*City, *State: [Hometown], [CT ▼]
*Zip:         [06033]
*Phone:       [860.555.1452]

⎬ 805

Vehicle Information
We will use this information to identify your vehicle when an order is placed over the Expresso Pass system Vehicle Type: [Toyota Corolla]
Color:        [Blue]
Plate Number: [123-ABC]

⎬ 905

* required fields     [Save Now]  Cancel

Done                                  tribecacafe.com

FIG. 9

SYSTEMS AND METHODS FOR PROVIDING REMOTE ORDERING CAPABILITIES

CROSS-REFERENCE TO RELATED APPLICATIONS

This application claims priority to U.S. provisional patent application Ser. No. 60/723,127, filed Oct. 3, 2005, the entire disclosure of which is incorporated herein by reference.

TECHNICAL FIELD

This invention relates to computer-based methods and systems for remote ordering systems and, more particularly, to remote ordering systems allowing customers to place orders from a computer workstation, within a vehicle or using mobile phones.

BACKGROUND

In recent years, point-of-sale (POS) devices having sophisticated control electronics and user interfaces with large displays and touch-pads or screens have streamlined consumer transactions and provided retailers with a great deal of data about the transactions. The dispensers include various types of payment means, such as card readers and cash acceptors, to expedite and further enhance these transactions. In some instances, the POS devices are augmented with sensor-based technology such as RFID. For example, gasoline pumps have been outfitted with RFID transponders that detect the presence of an RFID tag that, upon receiving RF energy from the transponder, interacts with the signal in such a manner as to identify the customer and, in some cases, their individual preferences such as purchase methods, pickup locations, and the like. In addition to using the data to complete the sale, it can be used as input to marketing analysis models to uncover consumer habits and preferences.

Recently, the use of sensor-based transaction systems has expanded to include communications of various types of information between a vehicle and other stations, such as fuel dispensers, toll booths, and parking facilities. The more sophisticated systems provide a transponder on the vehicle configured to communicate with a fuel dispenser wherein identification and financial information is sent from the vehicle to the fuel dispenser to effect payment for fueling. In some cases, customers can purchase additional goods and services, such as car washes and convenience store products at the dispenser. Once purchased, the customer need only pick up the goods and services at the station store or the outlet of a vending machine.

Although such systems allow customers to order automobile-related products and services and simple pre-packaged convenience store items such as candy and soda, they do not provide a means for customers to quickly and efficiently order, purchase, and receive quality food items and/or consumer goods that are "prepared to order." Instead, customers wishing to purchase a quality meal (e.g., restaurant quality food for an entire family and/or custom orders) are limited to either in-store dining or the traditional "take-out" service. However, for families that want quick, efficient service without sacrificing the aspects of a "local" restaurant where the proprietors are familiar with customers' particular likes and dislikes, neither of these options provide an optimal solution.

For example, a family wanting to pick up a healthy, quality dinner for four while returning from various afternoon activities may not want to sit for an entire meal at the restaurant, and the process of accumulating preferences of each family member can be daunting. In addition, restaurants (other than traditional fast-food operations, which offer little or no personal preferences) often do not provide "take-out" service because the throughput (i.e., the number of customers they can service per hour) does not warrant the additional expenses of such services.

What is needed, therefore, is a system and associated methods that allow customers to quickly order restaurant-quality food, place orders that are "personalized" to their particular likes and dislikes, and that minimizes the time necessary for the restaurant to receive, fill, and deliver the order.

SUMMARY OF THE INVENTION

In general, the invention relates to providing the infrastructure, systems, and methods to facilitate the ordering and provision of items using advanced technology with the goal of streamlining the ordering, order fulfillment, order delivery and payment process, while still allowing customers to select from and customize a variety of items available for purchase. Generally speaking, this goal can be achieved, in one exemplary implementation, through a three-step process. First, customers are invited to register with the system, which includes capturing customer data, payment preferences, item preferences, and, in some cases, issuing the customer an automated ID device that can be recognized upon the customer's arrival at the location at which the items are to be picked up. Second, customers place orders based on personalized menus or inventory lists of available items. By storing a customer's personalization data and providing them with multiple modes of order entry (web, phone, etc.), the ordering process can be done at any time from virtually any location. Third, sensor-based technology (e.g., RFID) is used to identify the customers upon arrival. As customers arrive at the location (either in a vehicle or on foot), their orders are paid for and delivered to them (either in the car or over the counter). Customers can manage their account over time, allowing for personal favorites, group orders, payment preferences, pickup locations, dates and times, and the like. Combining the up-front personalization and order acceptance system with the customer recognition aspect, customers will receive personalized service but in an efficient manner.

Accordingly, in a first aspect, the invention provides a method for fulfilling orders for items for sale. A request to place an order is received from a customer at a remote location (using, for example, the Internet, telephone and/or wireless access protocols), and based on a customer identifier included in the request, customer preference data is obtained. An electronic selection menu including items based on the customer preference data is transmitted to the customer, and the customer's order is received. The customer's arrival is automatically detected (via RFID, optical license plate recognition, or other similar techniques) and the completed order is provided to the customer.

The location at which the order is provided can be a restaurant (in the case of a food order), a grocery store or a market (for general consumer goods, for example). Customer preference data may include previously ordered items, payment preferences, and/or a preferred pickup location, all or some of which may be maintained in a customer preference database. Multiple preferences may be maintained for a customer, and in some embodiments represent preferences for multiple people (e.g., family members, employees, etc.). In some instances, a pickup location is suggested to the customer (based, for example, on a current or anticipated location of the customer), and may include providing an address, telephone number, and/or directions to the suggested location. The customers may also be provided with a radio frequency identification device that facilitates the automatic recognition of the customer when arriving at or approaching the location (whether on foot at a service counter or in a vehicle at the entrance to a parking lot or drive-through lane). In some implementations, the orders are received and picked up at the same location, whereas in other cases the order processing and order preparation and delivery steps may occur at separate locations, in which case the order is transmitted to the location at which the order is to be prepared and picked up by the customer.

In another aspect, the invention provides a method for fulfilling food orders at a restaurant that includes maintaining a database of customer data including a customer identifier and a customer preference for each customer, receiving a request including the customer code from a remote customer to place an order at the restaurant, retrieving the customer data associated with the customer using the customer identifier, transmitting to the customer an electronic menu including items based on the customer preference, receiving a menu selection from the customer, automatically detecting the customer's arrival at the restaurant, and providing the prepared order to the customer upon their arrival at the restaurant.

The customer preference can be a payment preference and/or an order preference. The request can be received via the Internet, a wireless access protocol, or using a voice recognition system. In embodiments in which the customer preference data relates to items for sale, information regarding the preferences can be provided to inventory control systems in order to affect subsequent inventory control decisions regarding the items. In some embodiments, the customer's arrival is automatically detected by a sensor-based monitoring system, such as a radio frequency identification system.

In another aspect, a system for fulfilling food orders at a restaurant includes a data storage module, a communications module, and a sensor-based monitoring system (e.g., a radio frequency identification system). The data storage module stores customer preferences relating to restaurant orders, and the communications module receives requests from remote customers to place orders (including a customer code) at a restaurant, transmits an electronic menu to the customer including items based on a customer preference associated with the customer code and receives the order from the customer. The sensor-based monitoring system detects the arrival of the customer at the restaurant and transmits instructions to the restaurant to provide the order to the customer upon their arrival.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention.

FIG. 9 is a screen capture of a vehicle registration page from an application that facilitates the remote ordering of food from a restaurant in accordance with one embodiment of the invention.

DETAILED DESCRIPTION

Figure 1:
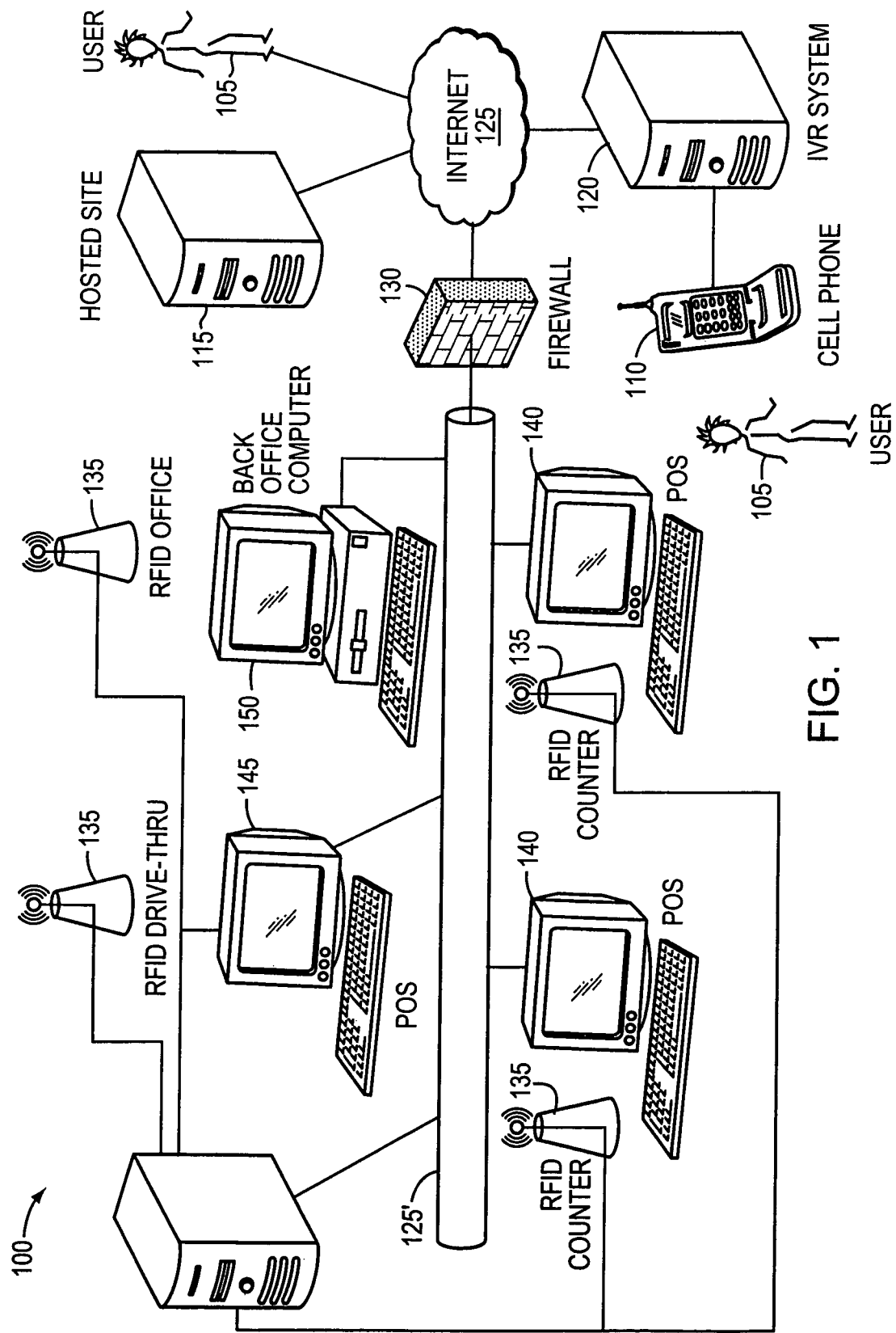
FIG. 1 is an illustration of an environment in which various embodiments of the invention may be implemented to facilitate remote ordering from restaurants.

Referring to FIG. 1, and in one embodiment, an exemplary order management system 100 provides customers 105 with multiple ways of communicating orders from remote locations using automated means. The system includes an internet-based customer interaction server 110, an RFID subsystem 115, and a point-of-sale subsystem 120, each of which is described in greater detail below. In some implementations, the system 100 may also include a voice recognition server 125 that allows customers to use verbal commands to order items, and in some instances recognize customers based on voiceprint identification technology. Further, the system allows the customers' orders to be provided to the customer upon their arrival based on automated detection methods.

In summary, customers 105 use one or more remote communication modalities (e.g., the Internet 130, cellular telephones 135, PDAs, automobile-based information systems, etc.) to pre-order orders (such as restaurant, grocery store, or retail items) by selecting the items from a menu or inventory of items. Unlike conventional take-out order systems or web-based grocery purchase applications, the list of items (either a menu or inventory list from a grocery store or retail chain) presented to the customers is tailored to the individual likes and habits of each customer, and their arrival at the restaurant or store is automatically detected using RFID readers 140.

Figure 2:
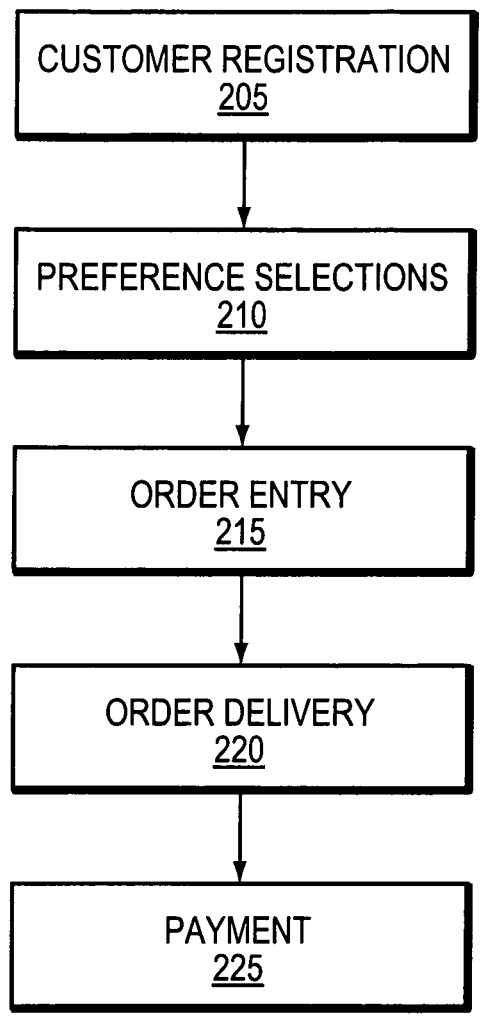
FIG. 2 is a flow chart depicting, in summary, a process for remotely ordering food from a restaurant in accordance with one embodiment of the invention.

Although the system and associated methods can provide these features in various embodiments, the technique can be described generally as occurring in five phases as illustrated in FIG. 2: the customer registration phase, the preference selection phase, the customer order phase, the order delivery phase and the payment phase. In some implementations, however, the order in which these phases may differ and certain phases may occur in parallel. For example, in instances in which the customer has pre-allocated funds on account or has previously provided a credit card number, the payment phase may occur after order entry but prior to order delivery. In other cases, companies that use the system for catering and/or on a frequent basis may indicate that they wish to be billed on a periodic basis (e.g., monthly) for all orders placed during that period. In such cases, multiple order and delivery phases may occur prior to the payment phase.

Registration Phase

Figure 3:
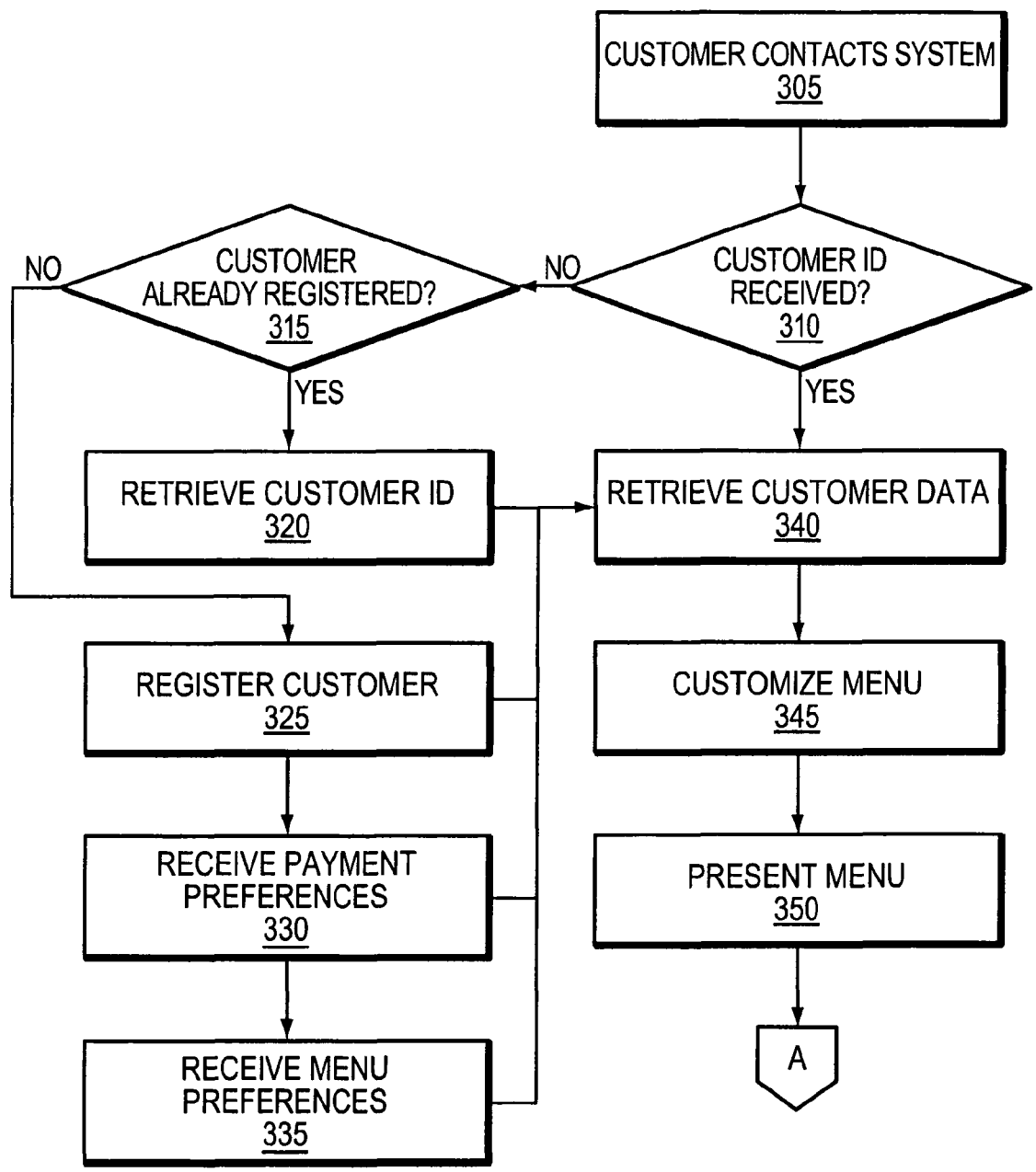
FIG. 3 is a more detailed flow chart depicting the steps for interacting with a system that facilitates remote ordering of food from a restaurant in accordance with one embodiment of the invention.

Referring to FIG. 3, customers contact the system (STEP 305) by one of various methods. For example, a customer may be at work and wish to order food for dinner that evening or groceries for pickup, and contact the system via a computer and the Internet. In another example, a user may be in an airport returning from a trip and use her cellular telephone to call and/or text message her order to the system. Other examples include the use of PDAs (e.g., TREO by Palm, Inc. or BLACKBERRY by Research in Motion, Inc.), that provide both web-based and message based technologies (email, text, etc.) with which the customer can contact the system, as well as automobile-based navigation and on-board assistance systems (both factory installed and aftermarket) such as ONSTAR by General Motors and various satellite-based systems.

The system then determines (STEP 310) if a customer ID was received as part of the initial contact. For example, if the customer is a returning customer that had previously registered with the system and is contacting the system via the Internet, a cookie file that including a customer ID may be stored on and retrieved from their workstation and used to identify the customer. If the customer contacts the system via telephone, the system may utilize the caller-ID feature to receive the telephone number from the customer is calling and use the number to retrieve customer information. However, for new customers, it is likely that no such ID will be provided, nor is it likely that their telephone number would be recognized. In such cases, the system may perform an additional check to determine if the customer is already registered (STEP 315) by presenting the user with a user login screen or telephony-based menu system. By providing this second, interactive check, the system considers cases in which previously registered customers are contacting the system using an alternate device. For example, a customer may have registered and used her workstation to communicate with the system in the past, but use her cell phone on a particular occasion. In such cases, the system allows the customer to provide (STEP 320) her customer ID using the alternate device, and can then retrieve her customer data.

However, for customers using the system for the first time, the system facilitates registration with the remote ordering system in many ways. In one particular embodiment, the invention facilitates registration through an on-line, web-based registration system. Preferably, the customers enter information about themselves during the registration step (STEP 325) through a series of web-based forms. Examples of information can include such information as the customer's name, contact information (i.e., mail address, telephone number, email address), a username (e.g., an "alias" or "handle") for use on the site, a password, and/or certain demographic information.

In some embodiments, a customer's account may be associated with a group of related customers (e.g., a spouse, children, friends, co-workers, etc.) For example, a mother of two may register as a customer, and create three additional "sub-users" for her spouse and two children, respectively. In some cases, one or more of the sub-users are able to use the account to order food and make payments (spouses, older children) whereas in other cases the sub-users are passive—i.e., they are merely placeholders for storing order preferences. In certain examples, a customer account may be attributed to a school or day care facility and used to schedule, order and/or pickup larger quantities of meals. For example, a day care facility may offer its families access to the system under a common ID, and allow parents to pre-order lunches for their children, and have a daycare employee pickup all the meals at a designated time.

In addition, certain customers may wish to include payment preferences (STEP 330) as part of the registration process. For example, users may provide a credit card number, invoice number, bank account number, PAYPAL account number, or other such information that allows the system to automatically bill the customer. In some instances, customers may elect not to include payment instructions, or may indicate that payment should be handled "off line" using, for example cash upon receipt of the order. Other payment options may include payment frequency (e.g., pay-per-order, monthly invoice), account balance limits that permit the system to replenish an customer's account balance by charging a credit card or debiting a bank account, the triggering of email messages to the customer when an account balance exceeds a certain minimum and/or maximum threshold, authorization of an amount to be charged to their credit card as an initial "credit balance" for their account, or any combination of the above.

In embodiments in which customers' order preferences are maintained, customers may also provide menu preferences (STEP 335). The preferences can be based on a preset menu, user supplied items, general food preferences, or any combination thereof. For example, during the registration phase, the customer is asked to provide their coffee preferences (decaf, milk, sugars, cream, latte, etc.) by typing their preference into a text box. In other cases, the customer is presented with an electronic menu of available items (appetizers, entrees, desserts, side orders, beverages, etc.) and selects which items they believe they will order frequently, including, in some cases, preferences about the items. For example, a customer indicating that they wish the "Hamburger Lunch" to appear as their first choice, may also indicate that they prefer it to be "medium-rare, with cheddar cheese." In some cases, multiple preferences can be selected to allow users to indicate a favorite based, for example, on the time if day, thus allowing a customer to have a preferred breakfast order, a preferred lunch order, and a preferred dinner order. In such cases, a different preference can be presented to the customer based on the time of day the customer calls to place the order. Customers may also provide general food preferences (e.g., low-calorie, vegetarian, no shellfish, etc.) that can then be used as a "filter" and applied to generally available menu items. This process of indicating preferred orders and individual preferences relating to the items can be repeated for each sub-user, thus building a pre-set order for multiple family members, including each family member's preferences.

In one embodiment, the customer registration process includes providing the customer with an RFID tag that is uniquely associated with that customer's account. The RFID tag can be small enough for a customer to carry (e.g., a key fob-type tag) or in some cases the tag can be attached to the customer's vehicle. The RFID tag may then be used to identify the customer upon arrival at the restaurant, as described in further detail below.

Receiving Customer Orders

Upon completion of registration and/or successful authentication to the system (in some cases, during the same "session"), customer-specific information is received (STEP 340) (e.g., retrieved from a database) and the customer can place an order with the restaurant using one or more remote communications methods such as the Internet, cell phones, land-based telephones, vehicle-based display systems, hand-held PDAs and other wireless devices. Using a cell phone, for example, a customer located virtually any distance from the restaurant can call a phone number (the number being associated with a particular location, or in some cases a central number servicing multiple locations) and place an order. Initially, the customer provides some form of authentication (e.g., a user ID and password) or, in some instances, the system automatically recognizes the customer based on identification information associated with the device (e.g., an IP address, phone number, MAC address, digital certificate, product serial number, etc.). In embodiments employing voice recognition technology, a digital representation of the customer's voice provides the authentication information.

Once authenticated, the customer is presented with an electronic menu, which in certain implementations may be customized (STEP 345) based on the customer's preferences. The form of the electronic menu may be visual (e.g., on a web page or a PDA display), audio (using a keypad-based selection menu) or both. In some embodiments, the electronic menu includes all items offered by the restaurant, whereas in other embodiments the electronic menu only includes those items previously selected by the customer and/or excludes items that do not meet the user's general preferences. In some cases, the customer's selections are augmented with other items such as new menu choices and/or specials, and may be updated as individual items are ordered. The presentation of additional menu items may also be based on an analysis of previous orders of customers having similar ordering histories and/or demographic information. Such recommendations can be provided automatically with the customized menu, or in response to the customer's request to see new or previously unordered items that people with similar demographic profiles and/or order histories have ordered. By presenting the customer with a custom menu (STEP 350) based on their likes, dislikes and prior orders, the restaurant provides the customers with quick access to those items they routinely order, while adding to the "individual" appeal of the restaurant.

In some embodiments, the menus may include advertisements. These advertisements may be related to the restaurant or store at which the customer is ordering. In other examples, the areas of the menu (e.g., background, header, etc.) may include ads for other stores that provide similar products, or specific brands. For example, a restaurant chain typically provides a particular brand of soft drinks for its customers (e.g., COKE, PEPSI, etc.). The restaurant may, in exchange for better pricing from the soft drink supplier, include ads for that brand on the menu and annotate the menu with logos of the supplier.

In some embodiments, the ads may be selected based on the preferences and/or demographics of the customer. For example, if a customer includes all vegetarian selections as her preferences and lives in an urban area, the menu may include ads for local organic markets.

Because the identity of the customer is known as the order is entered (using a user identifier or recognized telephone number, for example), their preferences (both for food items as well as payment and/or delivery preferences) can be retrieved by the system. Payment for the order may be completed prior to pickup, thus eliminating the need for the customer to present cash or credit cards, and eliminating the need for restaurant staff to handle payment. The order is relayed to the kitchen (or to the location preparing the order), and the items are then prepared to order. As a result, the customer's order is paid for and waiting for them upon arrival.

Figure 4:
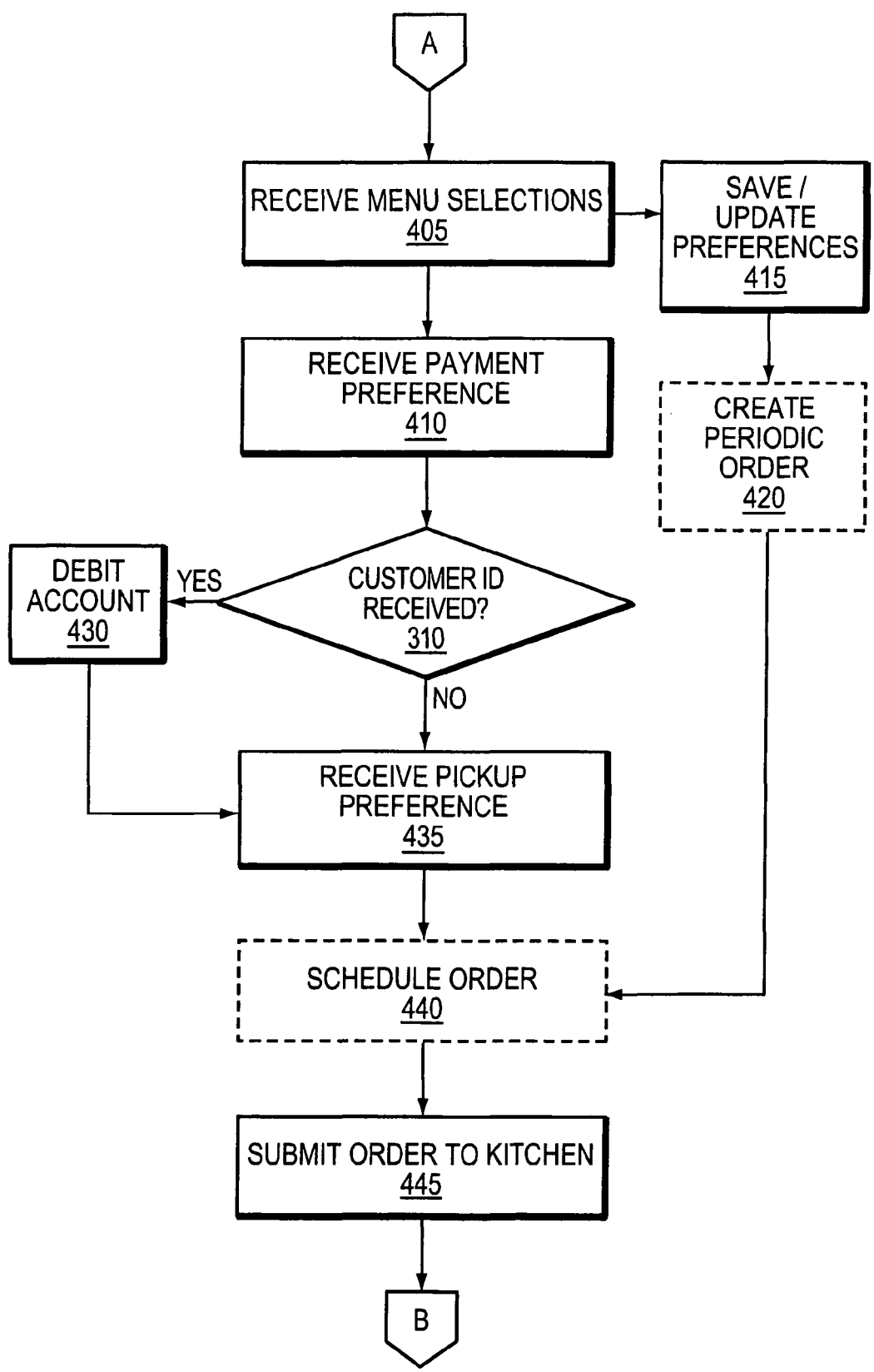
FIG. 4 is a continuation of the flowchart of FIG. 3.

Referring to FIG. 4, once the customer has received her menu (either unaltered or customized based on her preferences) she can select item(s) of interest and those selections are received (STEP 405). In an example where the customer has stored pre-selected items (and possibly personal preferences as well) those items may be presented to the customer as "default" choices. As one non-limiting example, a customer calling the phone number to order food, once authenticated, hears "to order your first saved order, press 1, to order your second saved order, press 2, to order a new item, press 3" and so on. In some cases, the saved orders may include customer-provided descriptions, such as "Steve's lunch order" or "Tuesday Group Lunch." Customers using a web-based interface select their orders using any one of the commonly used methods for indicating selections on web-based forms such as check boxes, drop-down lists, and others. In some instances, the customer indicates a particular date/time (or range of time) that she anticipates picking up the order, thus allowing customers to pre-order meals hours, or even days in advance. The customer's payment preference is also received (STEP 410) in instances where she has not previously provided such instructions or wishes to use alternative forms of payment. The customer may also indicate if her current selections (for food, delivery and/or payment) should be saved (STEP 415) as part of her preference profile so they may be presented during subsequent sessions. In some cases, the customer may indicate that certain orders (e.g., a coffee and bagel) are "periodic"—i.e., that she would like that order prepared every weekday, for example. If so, the system creates a standing order (STEP 420) for that customer based on the particular days of the week and times she wishes to pick up her order.

Once a customer's order is received, the system determines if payment instructions are associated with the account (STEP 425). If so, her account is debited (STEP 430). The account may be debited, for example, by subtracting the amount due from a current account balance the customer has on file, by initiating a credit transaction to the customer's bank account or credit card, by adding the amount due to an outstanding account balance (for periodic billing, for example) or by generating an invoice. If no payment preference is on account, the order indicates that payment will be due upon pickup.

In addition to payment preference, the customer's pickup preference for the order is also received (STEP 435). In some embodiments, the customer can indicate a default pickup preference (e.g., walk-up, drive-through) during registration, and the preference may be applied to the particular order. In some cases, however, the customer may prefer to provide her pick-up preference on an order-by-order preference. In other examples, a customer may provide multiple pick-up preferences. For example, a customer may indicate that she will pick up her periodic order (e.g., a weekday morning coffee and bagel) using the drive-through window, but all other orders are picked up at a walk-up counter. In other instances, the customer may augment already existing pickup preferences. For example, the customer may have previously indicated that all orders are picked up at the walk up window, but not have specified a particular time.

In implementations in which the system processes orders for multiple locations, a customer may indicate a preferred pickup location for certain orders. For example, a customer may initiate a breakfast order and have previously attributed a particular pickup location (e.g., along her route to work in the morning). Other orders, however, may be associated with other locations, so that customers may pickup orders at whichever location they deem convenient. In certain implementations in which a customer's current location can be determined based, for example, on a GPS-enabled telephone or on-board vehicle navigation system, the system may suggest a location based on the customer's current location, and in some embodiments, provide an address, telephone number and/or directions to the location at the which the order can be picked up. Such a feature is useful in circumstances where a customer is in an unfamiliar area and does not know where a particular location is, but wishes to use the system to place an order.

For orders that are to be picked up at some future date and/or time, orders are scheduled (STEP 440) according to the pickup instructions received with the order. For example, a customer may place a dinner order at 10:00 am for pick up at 7:00 pm (or, in some cases, have a standing dinner order for every Wednesday night at 7:00 pm). Such orders may be queued for processing such that they are not prepared too far in advance and are freshly prepared when picked up. In other scenarios, the system provides a reminder message to the customer prior to preparing an order via the telephone, text message, email, or other similar means.

In certain cases, a customer may indicate their current location (either manually, or automatically via GPS data retrieved from their telephone or automobile-based communication system). Based on the current location, the system can calculate an estimated arrival time (e.g., if the customer is 25 miles away on the highway, their arrival would be expected in approximately 20-30 minutes) and queue the order for processing accordingly. Once an order is queued, it can then be released to the kitchen (STEP 445) at the appropriate time.

Order Delivery

One flaw of conventional take-out operations is the high error rates. Very often, customers receive the wrong orders due to miscommunication while ordering, errors during preparation, or misdelivery (customer A receives customer B's order, for example). Further, because of physical limitations on a restaurant (size, accessibility, etc.) a limited number of drive-through service windows are available, and thus the throughput of the drive-through is limited. The time necessary for ordering food, waiting for its preparation and/or packaging, and payment further limits drive-through traffic. By accepting orders prior to customer arrival (as described above) and automatically detecting customers as they arrive (using, for example sensor-based monitoring devices such as RFID stations and/or license plate recognition systems located at various locations inside and/or outside the store or restaurant), the invention significantly increases customer throughput while simultaneously reducing errors.

Figure 5:
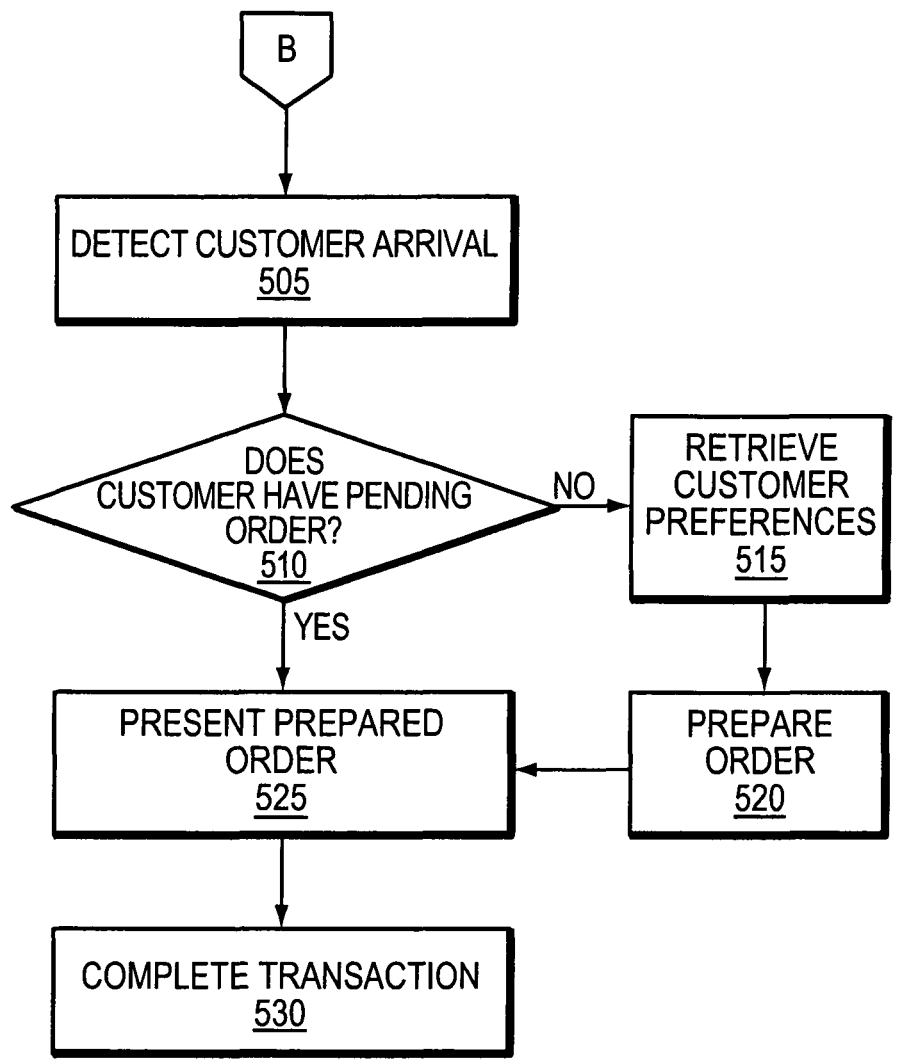
FIG. 5 is a continuation of the flowchart of FIG. 4.

Referring to FIG. 5, and as one example of an implementation of the invention, RFID stations are placed at the driveway leading into the parking lot of the restaurant. As a customer drives past the station, an RFID tag assigned to the customer enters the operational radius of the station, thus detecting the arrival of the customer (STEP 505). The station emits RF energy, which, upon contact with the tag, is reflected back to the station in a manner that indicates the unique code assigned to the tag. Because the tag is uniquely associated with the customer, the system matches the orders being prepared at the restaurant with the arriving customer. The system can determine if the customer has a pending order (STEP 510) and indicate to the restaurant staff that the order is ready for pickup. In some cases, a customer may not have any pending orders, but because she previously registered with the system, has presented an RFID tag (either at a counter or drive-through lane) and provided her food preferences (e.g., medium decaffeinated café latte), her order can be prepared (STEP 520) without requiring her to speak to a staff member. In addition (or alternatively), customers can "announce" their arrival at the restaurant's location using a messaging device such as a cell phone, pager, or hand-held PDA by calling or messaging a designated phone number or messaging address. In such cases, the system automatically recognizes the phone number or source address of the messaging device, and can use the number as customer identification information with which it retrieves the customer's order and/or order preferences. The order may then be presented to the customer (STEP 525). The customer can either remain in the car and receive delivery of her order, pick up her order at a drive-through station, or park and enter the restaurant to complete the transaction (STEP 530). In some cases, RFID stations are also placed at the entry to the restaurant, thus alerting restaurant staff that a particular customer has arrived.

In some cases, additional customer information (name, specific preferences, previous orders, customer feedback response forms, etc.) is provided to the restaurant staff as the order is given to the customer, allowing the staff to greet the customer by name, and confirm that any special requests (e.g., "of course, Mr. Smith, your extra guacamole is there, as you prefer") have been attended to. Such personalized service, delivered in a quick, efficient, and accurate manner is a significant improvement over traditional restaurant service.

In addition to improving the ordering and pickup experience for customers, maintaining data regarding customer preferences, standing orders, and trends across locations provides an opportunity to improve inventory management and staffing levels for the locations. For example, customer preferences and past behavior may be used to influence what, when and how much of certain items the restaurant or store will purchase from distributors to better serve the customers and, in the case of perishable goods, minimize spoilage. In particular, the systems can improve conventional inventory analysis techniques by predicting future orders based on newly entered preferences across a large sample size of customers.

Example Implementation

Figure 6:
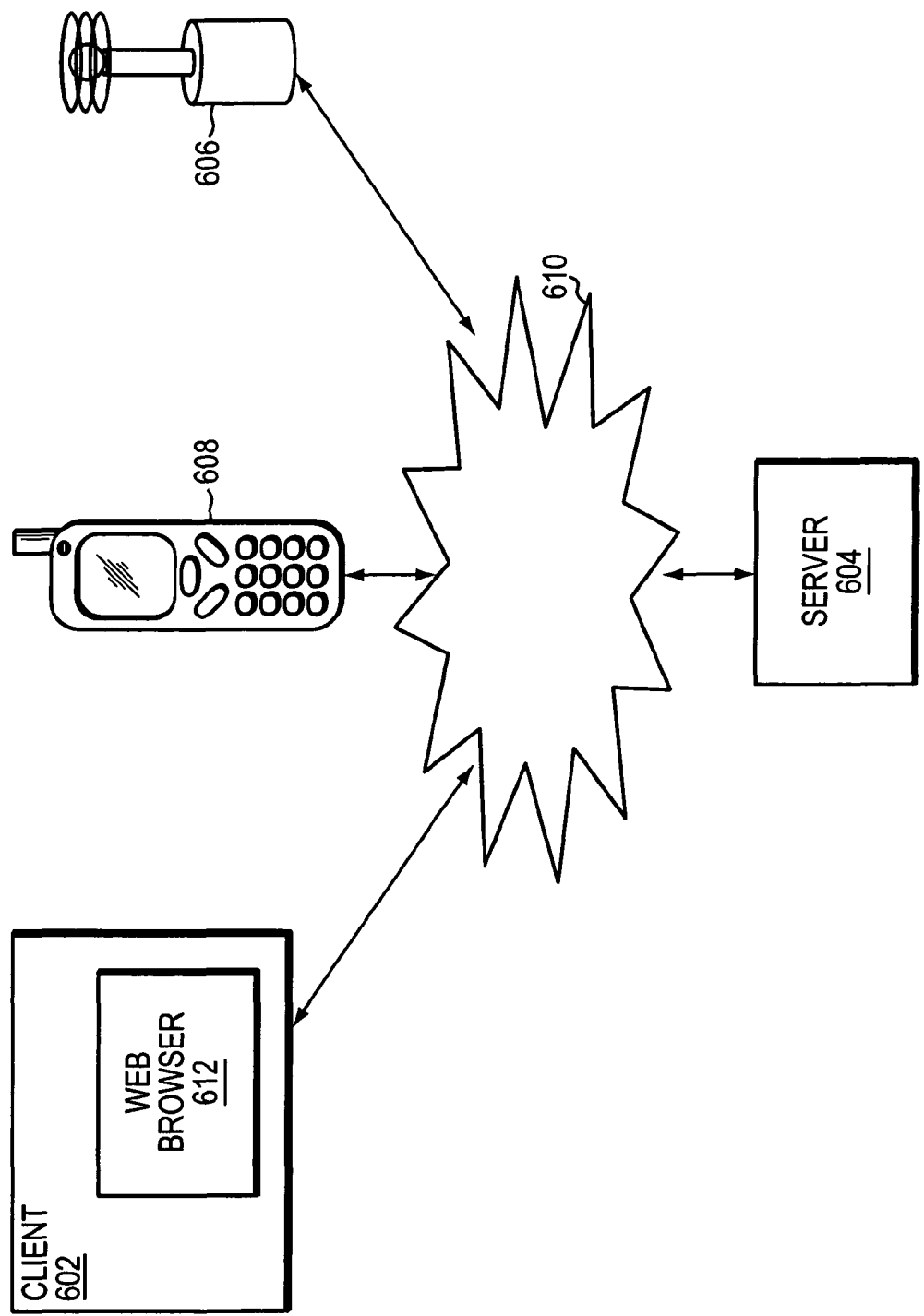
FIG. 6 is a block diagram of a system for providing remote food ordering capabilities according to various embodiments of the invention.

Referring to FIG. 6, in one embodiment the food order fulfillment system includes at least one server 602, at least one client 604, and at least one RFID station 606. In some embodiments, the system can accommodate clients of various forms and technologies, such as telephones 608. In some embodiments, communication between the server 602, the clients 604, and the RFID stations 606 utilizes a communications network 610. The order fulfillment system can include any number of clients, of various forms, including, but not limited to computers, cell phones, PDAs, vehicle-based displays, and the like.

In various embodiments, the client 604 includes a web browser 612 that allows the client to request a web page or other downloadable program, applet, or document (e.g., from the server) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client manually requests a web page from the server. Alternatively, the client automatically makes requests with the web browser. Examples of commercially available web browser software are INTERNET EXPLORER, offered by Microsoft Corporation, NETSCAPE NAVIGATOR, offered by AOL/Time Warner, and FIREFOX offered by the Mozilla Foundation.

The RFID stations 606 may interact with RFID tags, and incorporate RFID technology developed by any number of companies including Texas Instruments and Micron Technology.

The communications network 610 connects the clients 604, 608 and RFID stations 606 with the server 602. The communication may take place via any media such as standard telephone lines, LAN or WAN links (e.g., T1, T3, 56 kb, X.25), broadband connections (ISDN, Frame Relay, ATM), wireless links (cellular, 802.11, Bluetooth, etc.), and so on. Preferably, the network can carry TCP/IP protocol communications, and HTTP/HTTPS requests made by the web browser and the connection between the client and the server can be communicated over such TCP/IP networks. The type of network is not a limitation, however, and any suitable network may be used. Non-limiting examples of networks that can serve as or be part of the communications network include a wireless or wired Ethernet-based intranet, a local or wide-area network (LAN or WAN), and/or the global communications network known as the Internet, which may accommodate many different communications media and protocols.

The server 602 interacts with the clients 604, 608 and RFID stations 606. The server 602 is preferably implemented on one or more server-class computers that have sufficient memory, data storage, and processing power and that run a server class operating system (e.g., SUN Solaris, GNU/Linux, and the MICROSOFT WINDOWS family of operating systems). Other types of system hardware and software than described herein may also be used, depending on the capacity of the device and the number of customers and locations. For example, the server may be or may be part of a logical group of one or more servers such as a server farm or server network. As another example, there can be multiple servers that may be associated or connected with each other, or multiple servers operating independently, but with shared data. In a further embodiment and as is typical in large-scale systems, application software can be implemented in components, with different components running on different server computers, on the same server, or some combination. The server may, in some cases, provide operational support for multiple restaurants and/or grocery stores, allowing customers to select a particular location for pickup as well as specific menu or inventory items from each.

Figure 7:
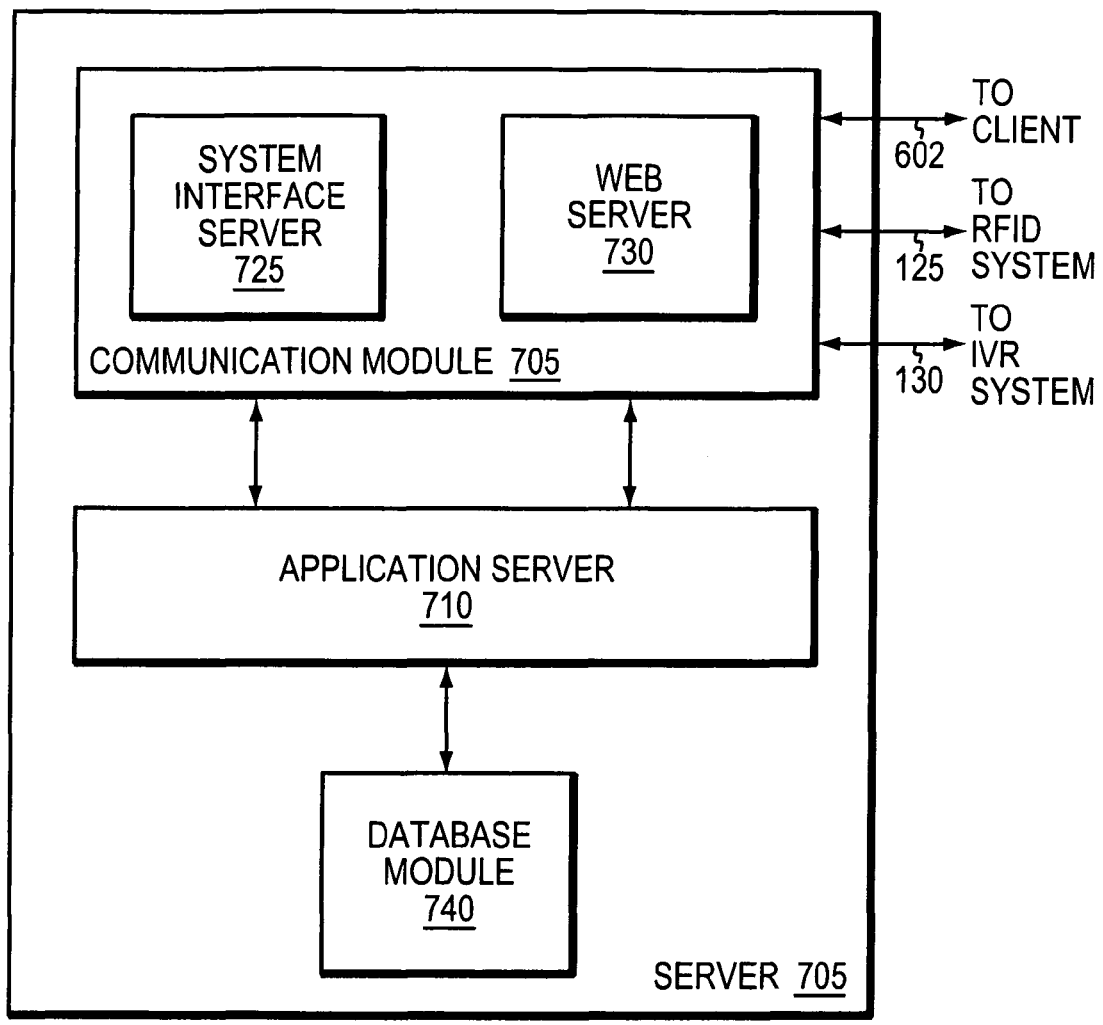
FIG. 7 is a block diagram of the server of FIG. 6 according to various embodiments of the invention.

Referring to FIG. 7, in one embodiment, the server 606 includes a client communication module 705 that provides a communication interface with clients and an application server 710 that provides the primary functional logic and instructions for the system. The client communication module 705 can be implemented as software running on one or more servers, or may be implemented as a stand-alone server. In some embodiments, the client communication module 705 can provide an interface to other system modules (e.g., an RFID system and/or a telephony system) and to a client web browser, so that, for example, a web browser can be used by a customer to access her account data and place orders. The interface to each of the other system modules and client web browsers can be implemented separately or in combination. In other embodiments, the client communication module 705 can also communicate using other protocols or mechanisms. In various embodiments, the communication module 705 facilitates HTTP/S requests and responses, Java messages, SOAP messages, SMTP messages, POP3 messages, instant messages, RSS feeds, as well as other electronic messages exchanged among customers, restaurant staff, grocery store clerks, as well as others. In some embodiments, the communication module 705 is or operates as part of the server 606, whereas in other cases the communication server may be a separate server, which may be operated by and/or outsourced to an application service provider (ASP), internet service provider (ISP), or other third-party.

The client communication module 705 communicates with the application server 710, which provides the main programming logic for the operation of the system. In one embodiment, the application server 710 is implemented as one or more application programs running on a server class computer, which may be the same or different computer as the client communication module 705. The application server 710 receives registration requests, order requests, RFID event notifications, and voice-response commands via the client communication module 705. The application server 710 also provides the infrastructure for implementing the customized, remote ordering capabilities described above. For example, the application server 710 determines a customer's preferences and presents her with a tailored menu or inventory list to the customer from which she can select her groceries, food, etc. As another example, in some embodiments the application server 710 may provide additional logic for determining arrival times of customers, scheduling orders, inventory control, nearest order pickup locations, and order routing.

The server 606, in some embodiments, also includes a database module 740 which stores data related to the restaurants, stores, menu items, inventory lists, customers, orders, RFID tags, and the like in one or more databases. For instance, the database module 740 may store information relating to the purchase histories of the customers, nutritional information about the menu items, payment information, advertisements and user information. The database module 740 provides data to the application server 710 for inclusion in messages, web pages, stored procedures, and applications (both residing on the client and/or the server). The data can, in some instances, be stored in one or more databases. The database module 740 can also store data relating the use and performance of the system itself, such as server availability, logging information and web traffic information. Examples of database applications that can be used to implement the database module 740 include MySQL Database Server by MySQL AB of Uppsala, Sweden, the PostgreSQL Database Server by the PostgreSQL Global Development Group of Berkeley, Calif., and the ORACLE Database Server offered by ORACLE Corp. of Redwood Shores, Calif.

In one embodiment, the client communication module 705 includes a system interface server 750 that provides an interface for communications with sub-systems such as an RFID system and/or a voice-recognition/telephony system. In one embodiment, the client interface server 750 is a software module executing on the server 606. In another embodiment, the system interface server 750 is a stand-alone server computer in communication with other components of the server 606, such as the application server 710. In one embodiment, the system interface server 750 communicates with other sub-systems using a messaging protocol that runs over TCP/IP for communications between sub-systems and the client interface server 750. The system interface server 750 may utilize various interfaces and/or services for exchanging data with the sub-systems. For example, the RFID sub-system may include an application programming interface ("API") through which the system can receive event notifications that a customer has arrived at a particular location. In other examples, the telephony system may operate as a web service thereby allowing other systems (such as the system interface server 750) to subscribe to the service and receive data and events using XML, SOAP, WSSL, UDI as well as other forms of data transfer.

In some embodiments, the server 606 and client communicate via a web browser that resides on the customer's device. In such an embodiment, the communication module 705 includes a web server 760. The web server 760 delivers web pages to the client 602 and provides an interface for communications between the web browser and the server 606. Preferably, the web server 760 is an enterprise class web server, such as APACHE from the APACHE FOUNDATION, INTERNET INFORMATION SERVER from MICROSOFT CORPORATION, or NETSCAPE ENTERPRISE SERVER from NETSCAPE COMMUNICATIONS CORPORATION, running on one or more server class computers, which may be the same or different computers than the client interface server 750. The web server 760 may be implemented as any communications device that is capable of serving web content to client web browsers over the communications network, and communicating with the other parts of the server 760, such as a personal computer, web appliance and so on. The web server 760 and the system interface server 750 are each in communication with the application server 710.

Although described above as independent subsystems and modules, this is for exemplary purposes only and these subsystems and modules may alternatively be combined into one or more modules or subsystems. Moreover, one or more of the subsystems described above may be remotely located from other modules (e.g., executing on another server in a server farm). Likewise, the system can be implemented with one or any number of servers, connections and interactive network components.

FIGS. 8-14 are screens from an exemplary web-based application that may be used by customers to place food orders for a restaurant from remote locations. In certain implementations, some or all of the screens may include, in addition to the functional features described below, advertisements relating to items offered by one or more of the restaurants, stores that utilize the system or other products or services. For example, in versions in which the system services multiple restaurants, advertisements for one restaurant may be placed at the top of a screen, with other ads placed at various other positions on the screen. In some cases, an entire copy of the system may be dedicated to a particular restaurant or chain, in which case the theme, styling, and overall look and feel of the various screens can be customized according to marketing or branding guidelines, thus providing a "private label" system.

Figure 8:
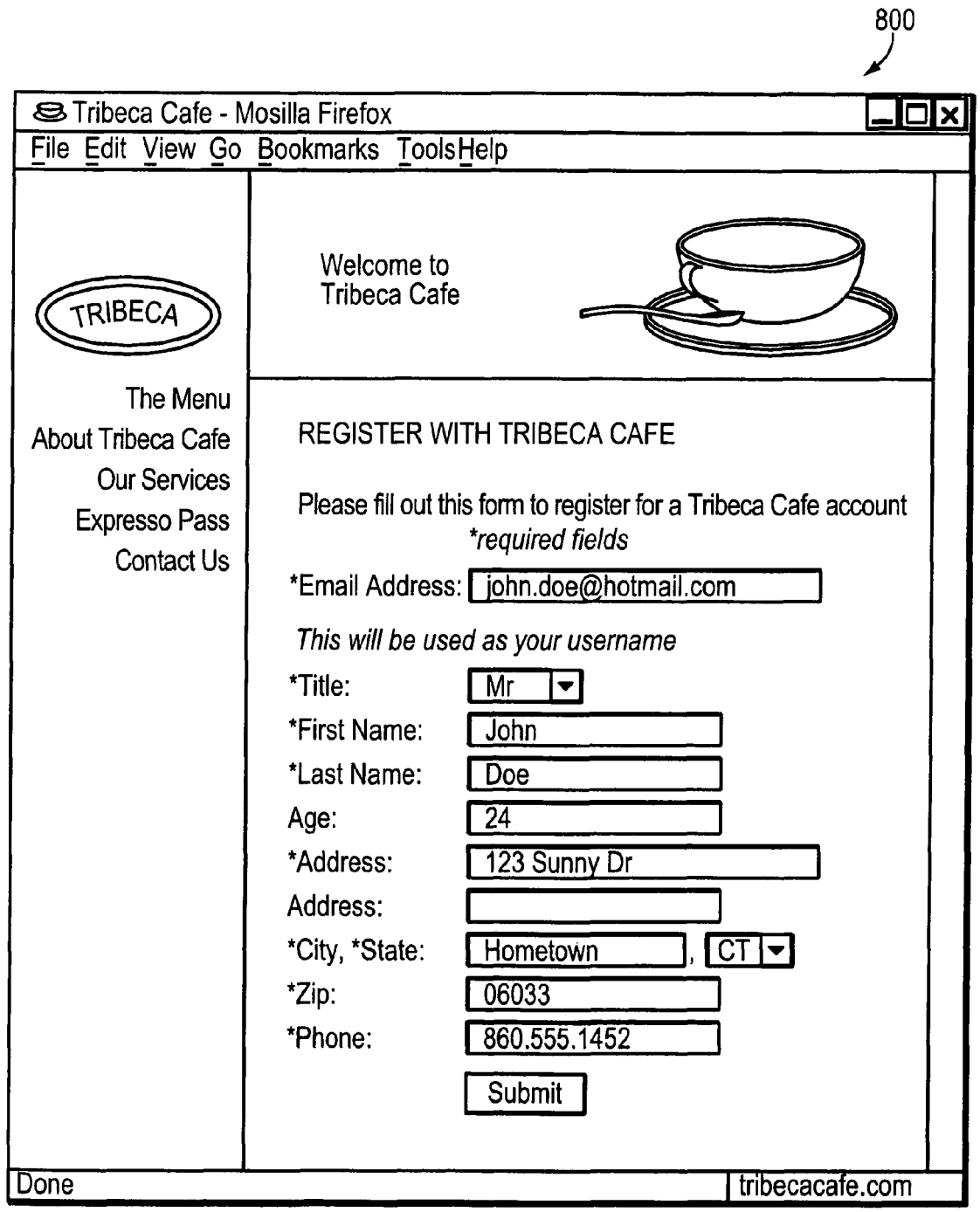
FIG. 8 is a screen capture of a customer registration page from an application that facilitates the remote ordering of food from a restaurant in accordance with one embodiment of the invention.

FIG. 8 is an example of a customer registration screen 800 that includes various fields 805 in which a customer enters registration data that may be used to identify and/or communicate with the customer such as an email address, name, age, address and telephone number. In some implementations, the email address acts as the unique identifier for each customer, whereas in other cases an additional "user ID" may be used.

FIG. 9 is an additional account information screen 900 at which a customer can provide descriptive information 905 about their vehicle. In addition to providing the make, model and color of the car, the customer may also provide a license plate number which can be used to uniquely identify the customer as they approach the store or restaurant. In some cases, an license plate recognition (LPR) system may be implemented as part of the remote ordering system to automatically scan license plates of automobiles as they approach the restaurant. For example, as a customer approaches the restaurant or store, the vehicle rolls over a detector such as a magnetic loop detector. The loop detector senses the car and its presence is signaled to the LPR unit, which in turn activates an illumination device (e.g., an infra-red beam) and takes one or more pictures of the front or rear plates using a camera. The images of the vehicle are read by the OCR system and analyzed using any one of may different image processing algorithms, enhances the image (if necessary), and extracts the plate string. The LPR unit checks if the license plate string exists in the database, and if found sends an event to the remote ordering system to indicate the arrival of the customer.

Figure 10:
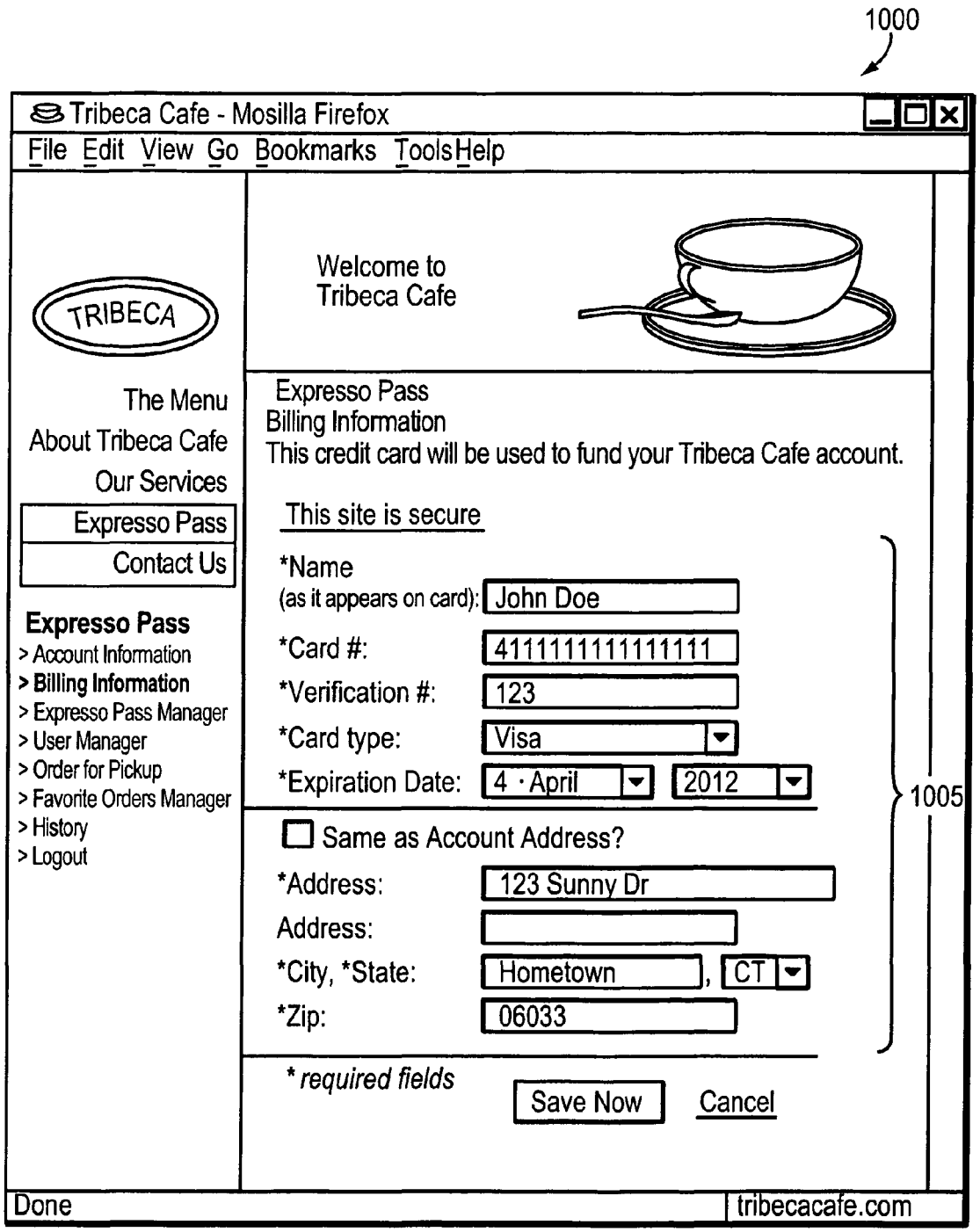
FIG. 10 is a screen capture of a billing preferences page from an application that facilitates the remote ordering of food from a restaurant in accordance with one embodiment of the invention.

Referring to FIG. 10, in one embodiment, a billing information screen 1000 includes fields 1005 into which a customer may enter billing information and preferences. For example, a customer can provide credit card information that can be used to automatically credit their account for each order.

Figure 11:
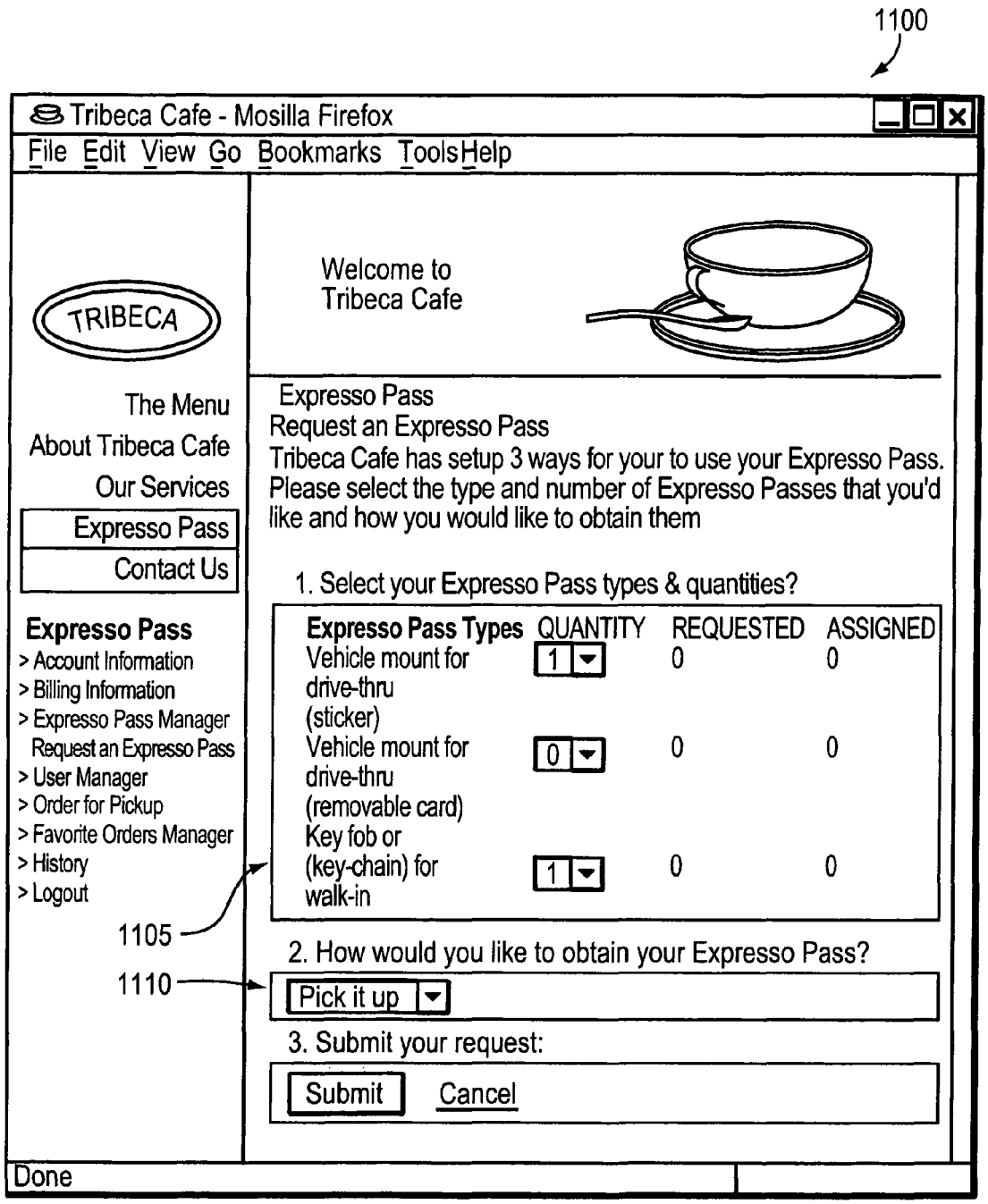
FIG. 11 is a screen capture of an RFID reader request page from an application that facilitates the remote ordering of food from a restaurant in accordance with one embodiment of the invention.

Referring to FIG. 11, in one embodiment, an express pass request screen 1100 allows customers to request wireless transponders that, when in the presence of a RFID sensor, announce the arrival of the customer at the restaurant or store. The screen 1100 includes fields 1105 in which customers can select the type and quality of devices, as well as a field 1110 indicating their preferred method of obtaining the device. In some cases, the transponder may be vehicle-based (e.g., a sticker-mounted device), a card, or a key-fob device that customers can carry in their purse or on a keychain. The transponders can be uniquely associated with a customer, or in some cases assigned to a group of customers such as a family or corporate account.

Figure 12:
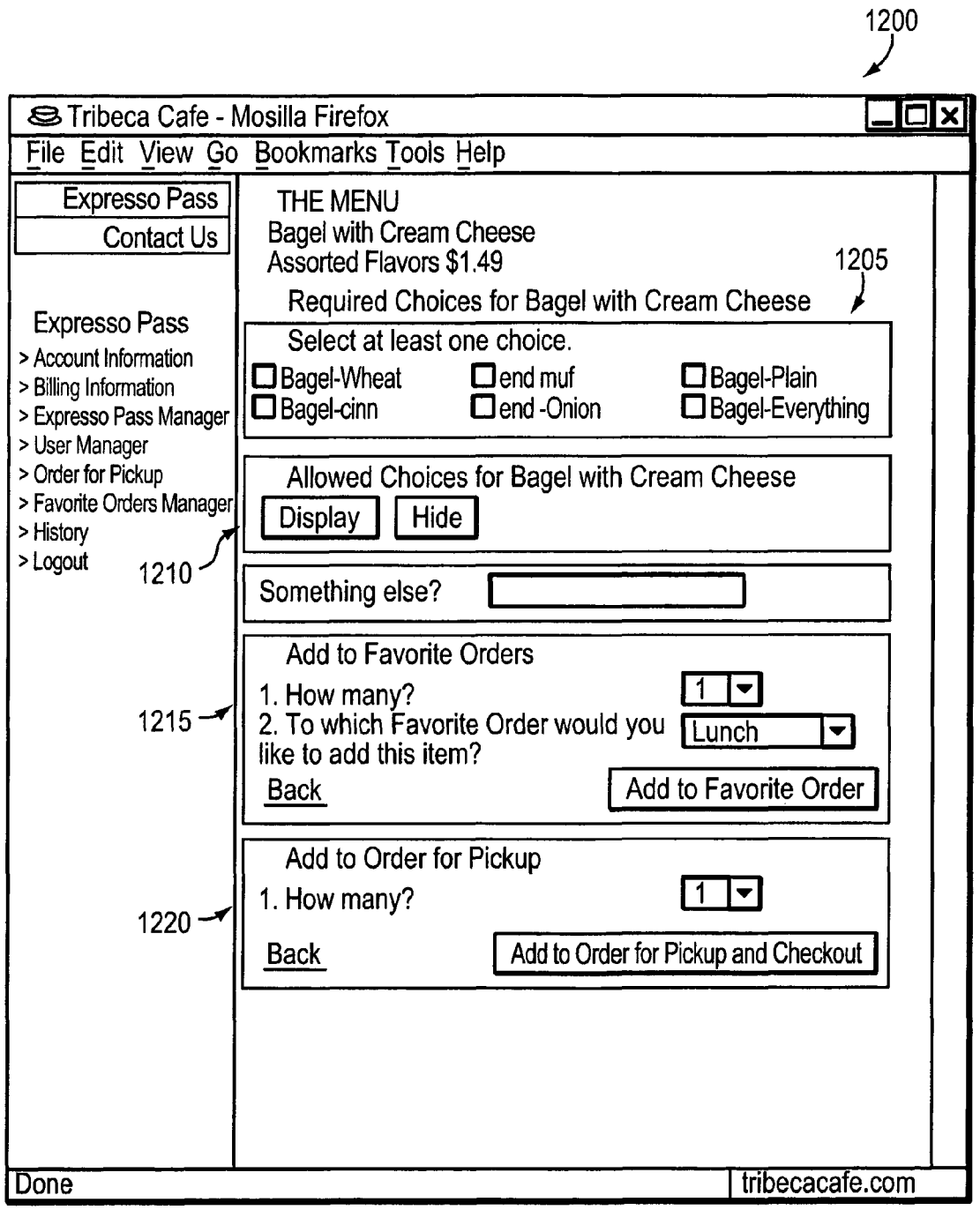
FIG. 12 is a screen capture of an order preferences page from an application that facilitates the remote ordering of food from a restaurant in accordance with one embodiment of the invention.

Referring to FIG. 12, in one embodiment, an item preference screen 1200 allows customers to select items and item preferences to add as favorite items. For some items, certain choices may be required 1205, such as the type of bagel or size of coffee. Other preferences 1210 may also be noted, such as whether a bagel is toasted, the type of side that will accompany an order (e.g., potato salad, chips, pasta salad, etc.). A free-form text entry field may be used to capture any additional customer preferences not typically associated with an item, e.g., extra cream cheese, double cupping coffee, etc. Quantity and order fields 1215 allow the customer to indicate the number of items she wishes to include in the order, and which of her pre-defined orders to which the items are to be added. In some embodiments, a customer can specify multiple different orders using names they chose, (e.g., breakfast weekdays, breakfast weekends, dinner weekdays, lunch weekdays, chicken lunch, meatloaf dinner, etc.) and may wish to include certain items on multiple orders and/or alter certain items on some orders. For example, a customer may indicate that the weekday breakfast order is to include a small coffee and one plain bagel with cream cheese, but on the weekend order two large coffees and two bagels. By maintaining customer-specific orders (and allowing the customers to periodically alter the orders as new menu items are introduced) the system can present a customer with her pre-defined orders, streamline the ordering process, and build a loyal customer base. The item screen 1200 also includes an order quantity field and checkout button 1220 that allow the customer to order the item on an ad hoc basis.

Figure 13:
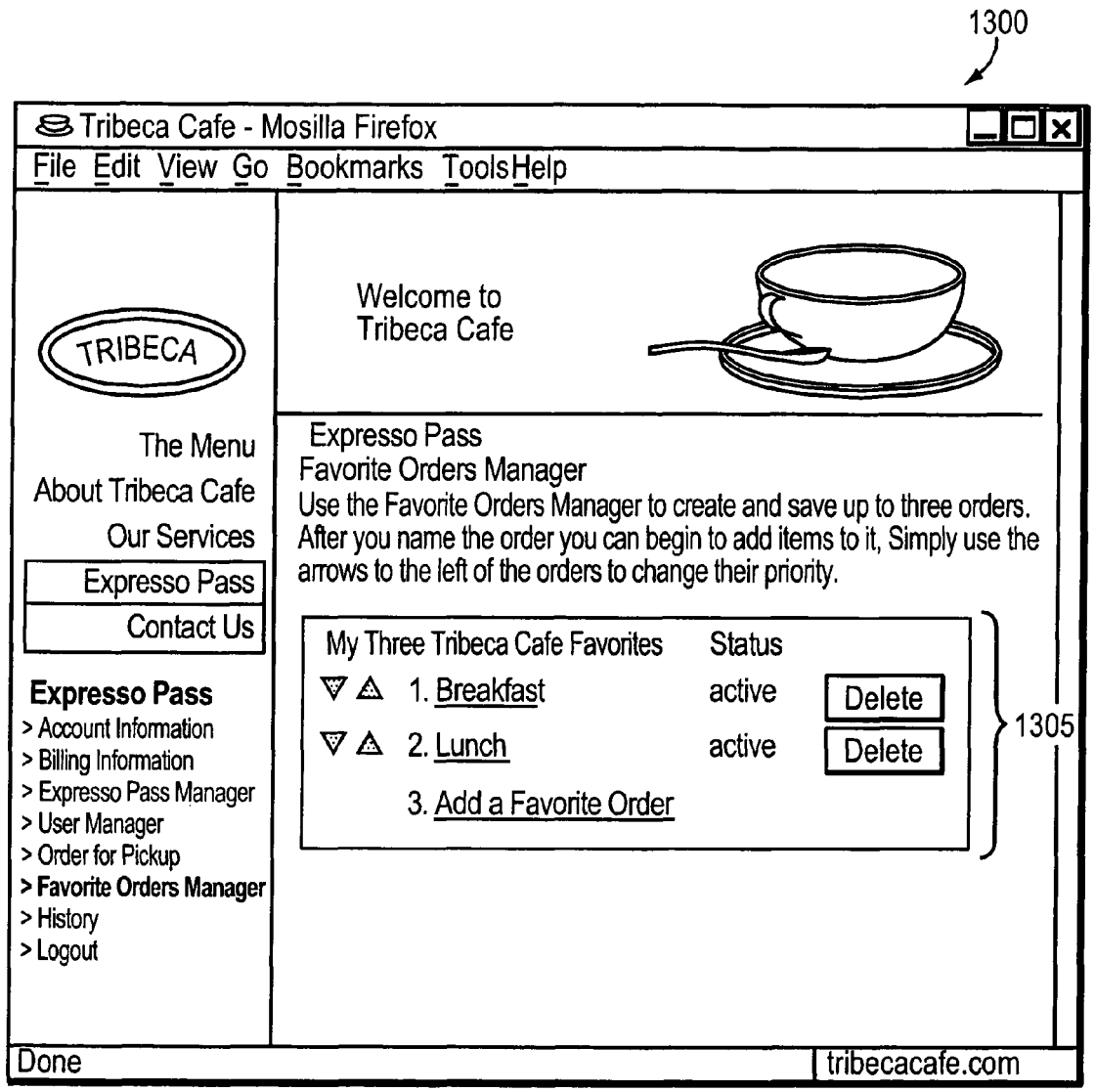
FIG. 13 is a screen capture of a customer favorites page from an application that facilitates the remote ordering of food from a restaurant in accordance with one embodiment of the invention.

Referring to FIG. 13, in one embodiment, an order management screen 1300 provides customers with links and buttons 1305 with which the customers can review their standing orders, delete the orders, or reprioritize the orders such that they are presented in a different sequence. For example, a customer may have previously indicated that the "chicken lunch" as her favorite order, and as such, it was presented as the first option when she contacted the order system (e.g., the "1" option when using telephone-based data entry). However, after weeks of ordering the chicken dinner, her preference may change, and by reprioritizing her orders can affect the order in which her orders are presented to her during the ordering process.

Figure 14:
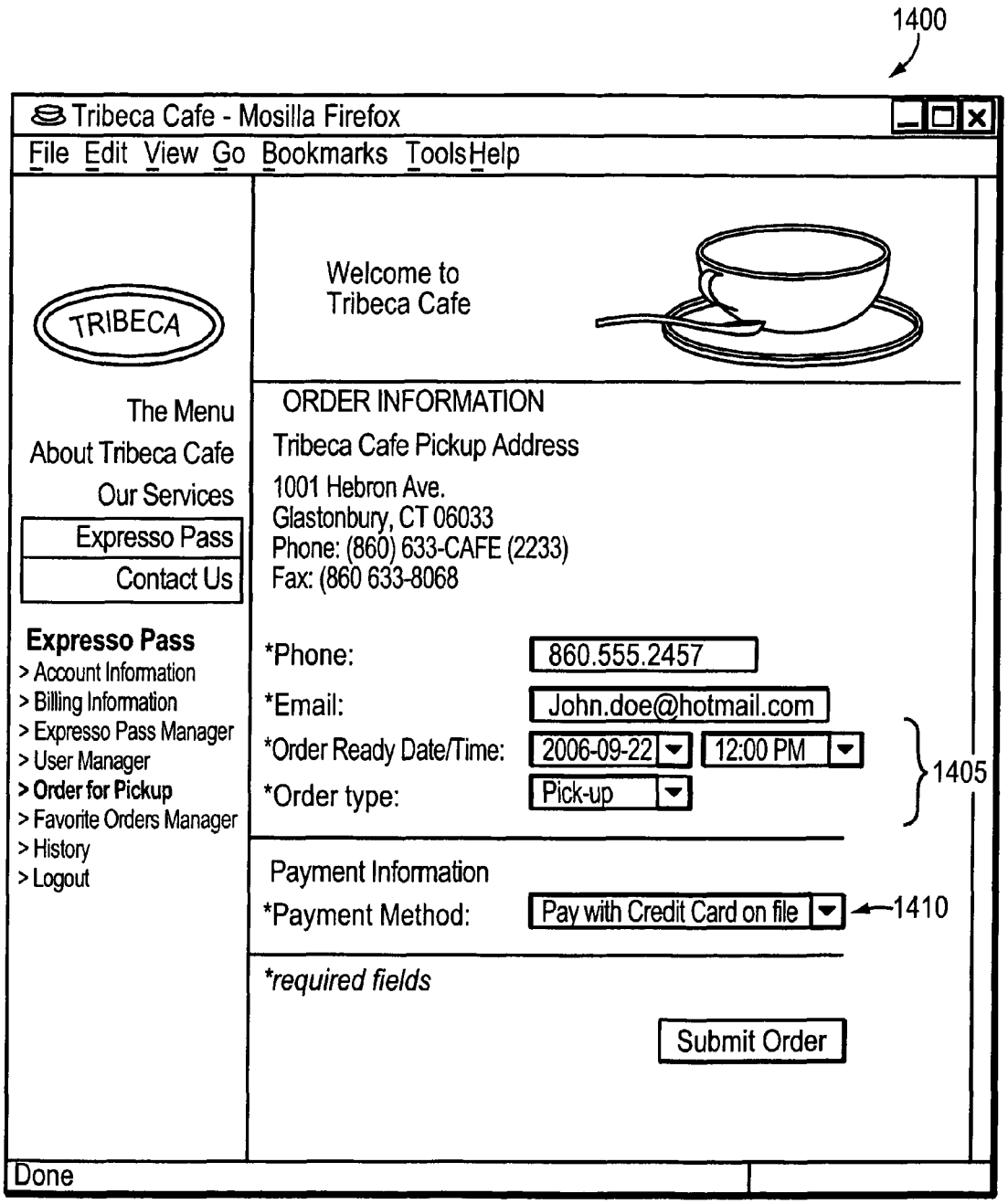
FIG. 14 is a screen capture of an order submission page from an application that facilitates the remote ordering of food from a restaurant in accordance with one embodiment of the invention.

Referring to FIG. 14, in one embodiment, a pickup screen 1400 provides customers with text fields and selection boxes 1405 that facilitate the scheduling of an order. For example, a customer may indicate that a particular order is to be picked up at a particular date and time. In other embodiments, a customer can indicate that an order is "periodic" (e.g., a coffee and bagel every weekday at 7:00 am) and provide the particular days of the week and time the order is to be picked up. Selection box 1410 allows the customer to select from one of the payment methods currently active for her account.

Although described here with reference to restaurants, and useful when implemented with regard to fulfilling orders from customers, the subject matter can be any sort of product delivery based activity. For example, grocery delivery services currently allow customers to order items over the Internet, however the items are then delivered to the customer's home or business. While convenient in some instances, in other cases it may be advantageous to provide pickup service in which a customer visits the store to pickup her order. Likewise, consumer goods such as clothing, electronics and office supplies (to name just a few exemplary items) may also be provided using similar techniques.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A method for fulfilling orders at a restaurant, the method comprising:
    maintaining a database of customer data associated with customers of the restaurant, the customer data comprising for each customer a customer identifier, general customer preferences, previously ordered items and a payment preference;
    receiving a request via a telephone from the customer to place an order at the restaurant, the customer being remote from the restaurant when the request is received;
    utilizing caller-ID to determine a telephone number from which the customer is calling;
    retrieving the customer data associated with the customer based on the telephone number; in response to retrieving the retrieved customer data, transmitting an electronic menu to the customer, the electronic menu comprising items selected from the group consisting of: the customer preference data, the time of day and other customer preference data associated with people having an order history similar to that of the customer;
    receiving a menu selection from the customer in response to transmitting the electronic menu, the order being based on the menu selection;
    automatically detecting an arrival of the customer at the restaurant;
    providing a prepared order to the customer upon the arrival of the customer at the restaurant; and
    billing the customer based on the payment preference, wherein the payment preference is selected from the group consisting of: billing on a periodic basis for all orders received during the period, billing against an account balance with set replenishment levels and limits, and billing with notice to the customer at selected thresholds.

2. The method of claim 1 wherein the general customer preferences further comprise an order preference.

3. The method of claim 1 wherein the step of receiving the request utilizes a voice recognition system.

4. The method of claim 1 wherein the step of automatically detecting the arrival of the customer utilizes a radio frequency identification system.

5. The method of claim 1 wherein the steps of receiving the request and receiving the order occur at a location different from the restaurant at which the order is prepared and provided; and
    wherein the customer data further comprises a restaurant location preference.

6. The method of claim 5 further comprising:
    transmitting the order to the restaurant at which the order is prepared and provided.

7. The method of claim 5 wherein the customer data further comprises for each customer a customer identifier and at least one restaurant location preference.

8. A system for fulfilling food orders at a restaurant, the system comprising:
    a data storage module configured to store customer preferences relating to restaurant orders, wherein the customer preferences comprise general preferences, previous restaurant orders and a payment preference;
    a communications module configured to:
    receive a request from a customer to place an order at the restaurant, the customer being remote from the restaurant location when the request is received;
    determine a telephone number from which the customer is calling using caller-ID;
    retrieve the customer preferences based on the telephone number; transmit an electronic menu to the customer based on the customer preferences, the electronic menu comprising elements selected from the group consisting of: the customer preferences associated with a customer code and the time of day;
    receive the order from the customer; and bill the customer based on the payment preference, wherein the payment preference is selected from the group consisting of: billing on a periodic basis for all orders received during the period, billing against an account balance with set replenishment levels and limits, and billing with notice to the customer at selected thresholds; and a sensor-based monitoring system configured to: automatically detect an arrival of the customer at the restaurant; and
    transmit instructions to the restaurant to provide the order to the customer when the arrival is detected.

9. The system of claim 8 wherein the sensor-based monitoring system further comprises a radio frequency identification system.

10. The system of claim 9 further comprising:
    a plurality of radio frequency identification tags, wherein each tag is associated with one customer; and
    wherein the sensor-based monitoring system is configured to automatically detect the tag.

11. The system of claim 8 further comprising:
    another communication module configured to receive the request and receive the order at a location different from the restaurant at which the order is prepared and provided; and
    wherein the customer preferences further comprises a restaurant location preference.

12. The system of claim 11 wherein the another communication module is configured to transmit the order to the restaurant at which the order is prepared and provided.

13. The system of claim 12 further comprising:
a database configured to store customer preferences associated with customers of the restaurant, the customer preferences comprising for each customer a customer identifier and at least one restaurant location preference.

* * * * *